(12) United States Patent
Faraboschi et al.

(10) Patent No.: US 9,614,728 B2
(45) Date of Patent: Apr. 4, 2017

(54) IDENTIFYING NETWORK COMMUNICATION PATTERNS

(75) Inventors: Paolo Faraboschi, Sant Cugat (ES);
Moray McLaren, Bristol (GB); Dejan S. Milojicic, Palo Alto, CA (US);
Robert Schreiber, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 167 days.

(21) Appl. No.: 14/374,804

(22) PCT Filed: Apr. 24, 2012

(86) PCT No.: PCT/US2012/034758
§ 371 (c)(1),
(2), (4) Date: Jul. 25, 2014

(87) PCT Pub. No.: WO2013/162511
PCT Pub. Date: Oct. 31, 2013

(65) Prior Publication Data
US 2015/0026318 A1    Jan. 22, 2015

(51) Int. Cl.
*G06F 9/46* (2006.01)
*G06F 9/44* (2006.01)
(Continued)

(52) U.S. Cl.
CPC ........ *H04L 41/0833* (2013.01); *G06F 1/3287* (2013.01); *G06F 3/1221* (2013.01);
(Continued)

(58) Field of Classification Search
CPC ..... G06F 1/32–1/3215; G06F 1/3234–1/3296; G06F 3/1221;
(Continued)

(56) References Cited

U.S. PATENT DOCUMENTS 6,549,781 B1    4/2003   O'Byrne et al.
7,142,868 B1    11/2006  Bloyles et al.
(Continued)

FOREIGN PATENT DOCUMENTS

CN    101483901 A    7/2009
WO    WO-2010144001  12/2010

OTHER PUBLICATIONS

Avinash Karanth Kodi et al, Energy-Efficient and Bandwidth-Reconfigurable Photonic Networks for High-Performance. Computing (HPC) Sytems, IEEE Journal of Selected Topics in Quantum Electronics, vol. 17, No. 2, Mar./Apr. 2011, 12 Pages.
(Continued)

*Primary Examiner* — Brendan Higa
(74) *Attorney, Agent, or Firm* — Brooks, Cameron & Huebsch, PLLC

(57) ABSTRACT

Examples of the present disclosure include methods, devices, and/or systems. Identifying network communication patterns can include analyzing a distributed computer program of a network, estimating virtual network communication traffic based on the analysis, and mapping the virtual network communication traffic to a physical network link. Identifying network communications patterns can also include identifying the network communication pattern and categorizing the physical communication network link based on an estimated communication intensity of the mapped communication traffic and the network communication pattern. Identifying network communication patterns can further include optimizing an energy used by the network based on the categorization.

6 Claims, 4 Drawing Sheets

(51) Int. Cl.
H04L 12/24 (2006.01)
G06F 9/50 (2006.01)
G06F 1/32 (2006.01)
G06F 3/12 (2006.01)
H04L 12/26 (2006.01)
H04L 12/12 (2006.01)

(52) U.S. Cl.
CPC ............ *G06F 9/5094* (2013.01); *H04L 12/12* (2013.01); *H04L 41/145* (2013.01); *H04L 43/10* (2013.01); *Y02B 60/34* (2013.01); *Y02B 60/42* (2013.01)

(58) Field of Classification Search
CPC . G06F 9/455–9/45516; G06F 9/5083–9/5094; H04L 41/0833; H04L 41/14–41/147; Y02B 60/30–60/50
See application file for complete search history.

(56) References Cited

U.S. PATENT DOCUMENTS

| | | | |
|---|---|---|---|
| 7,596,811 B2 | 9/2009 | Lloyd et al. | |
| 7,870,080 B2 | 1/2011 | Budike | |
| 9,298,621 B2* | 3/2016 | Li | G06F 12/0813 |
| 2003/0151619 A1* | 8/2003 | McBride | H04L 41/145 |
| | | | 715/736 |
| 2009/0097481 A1 | 4/2009 | Diab et al. | |
| 2009/0204828 A1 | 8/2009 | Diab et al. | |
| 2009/0265568 A1* | 10/2009 | Jackson | G06F 1/3203 |
| | | | 713/320 |
| 2009/0282277 A1 | 11/2009 | Sedarat et al. | |
| 2010/0118753 A1 | 5/2010 | Mandin et al. | |
| 2010/0153750 A1 | 6/2010 | Shah | |
| 2010/0250992 A1 | 9/2010 | Iyer et al. | |
| 2011/0153811 A1 | 6/2011 | Jeong et al. | |

OTHER PUBLICATIONS

Robert Preissl et al, Future Generation Computer Systems 26 (2010), pp. 147-154, Transforming MPI Source Code Based on Communication Patterns.

Abts, et al., Energy proportional datacenter networks, in Proceedings of ISCA. Jun. 2010, pp. 338-347, Saint-Malo, France.

Kamil, et al, "Communication Requirements and Interconnect Optimization for High-End Scientific Applications", IEEE Trans. Parallel Distrib. Syst., 2010, 21:188-202.

Li, et al., Thrifty interconnection network for HPC systems, in Proceedings of the 23rd international conference on Supercomputing (ICS '09), Jun. 2009, ACM, pp. 505-506.

PCT Search Report/Written Opinion—Application No. PCT/US2012/034758 dated Dec. 14, 2012—9 pages.

Vetter, et al., Communication characteristics of large-scale scientific applications for contemporary cluster architectures, J. Parallel Distrib. Comput. 63, 9 (Sep. 2003), 12 pages.

* cited by examiner

IDENTIFYING NETWORK COMMUNICATION PATTERNS

BACKGROUND

High performance computing (HPC) workloads can involve applications whose communication is organized in regular patterns. A parallel implementation of an HPC application may be parallelized across a number of nodes, where some nodes may be exchanging messages over the network with a first, smaller set of nodes and/or exchanging other messages with a second, larger set of nodes. The underlying networking topology for this HPC cluster may include a complex general-purpose multi-level switch topology (e.g., fat trees and/or folded clos), where network performance links may be kept active through synchronization messages and/or explicit configuration of switch routes,

DETAILED DESCRIPTION

Figure 1:
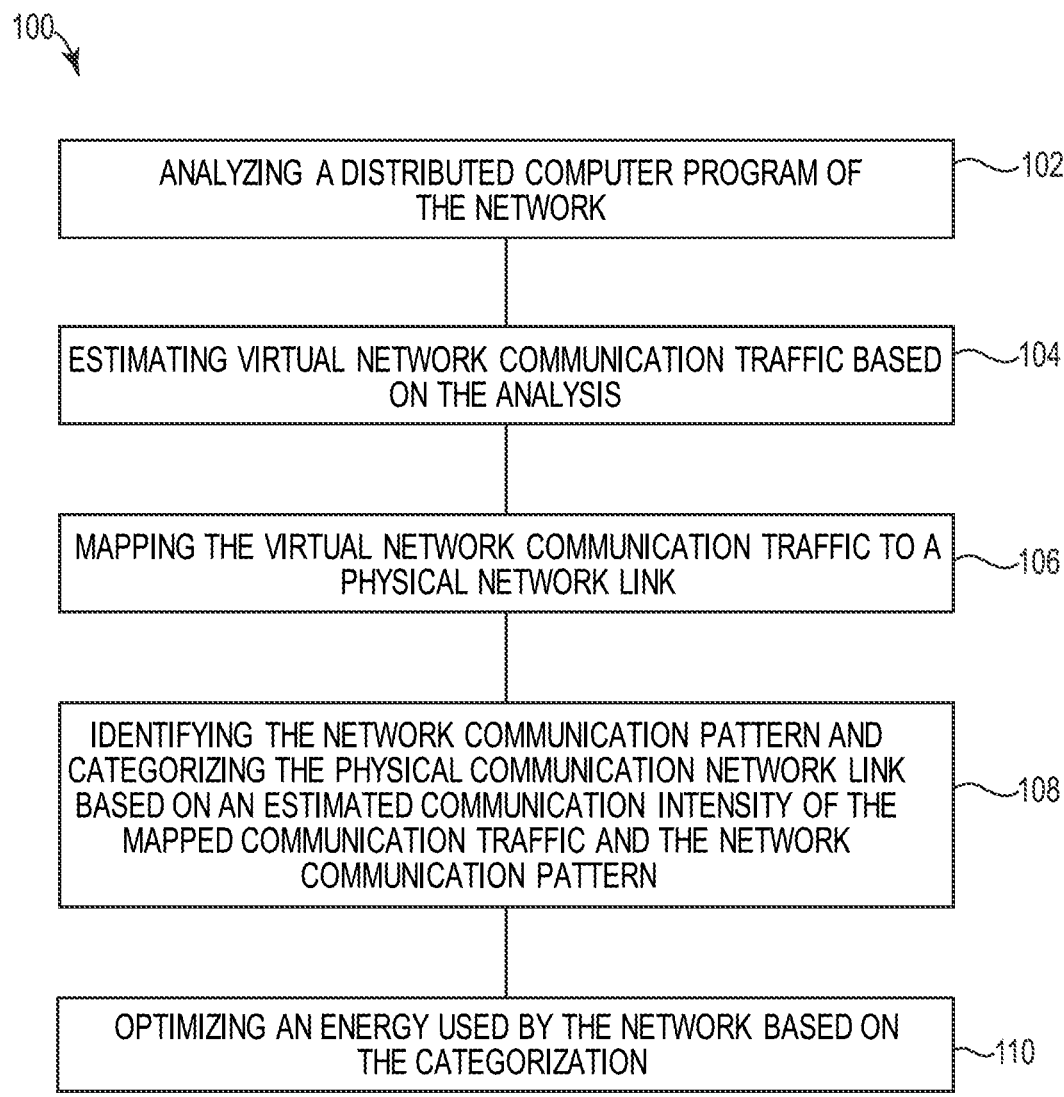
FIG. 1 is a flow chart illustrating an example of a method for identifying network communication patterns according to the present disclosure.

Examples of the present disclosure include methods, devices, and/or systems. An example method for identifying network communication patterns can include analyzing a distributed computer program of a network, estimating virtual network communication traffic based on the analysis, and mapping the virtual network communication traffic to a physical network link. An example method can further include identifying the network communication pattern and categorizing the physical communication network link based on an estimated communication intensity of the mapped communication traffic and the network communication pattern. An example method can also include optimizing an energy used by the network based on the categorization.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit or digits correspond to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

High performance computing (HPC) systems can include clusters of servers, with a number of individual nodes (e.g., tens of thousands of nodes). A node can include a computer (e.g., a computer composed of a number of processing CPU cores executing in parallel) with a single shared address space, for example. A cluster of nodes can include a collection of nodes with a communication network that allows messages to be sent between nodes. As clusters increase in size, a networking component of the cluster can consume increasing amounts of power.

Network power usage may be under-provisioned, meaning that a total power available (e.g., a power budget) may not be enough to run all the computing nodes in the HPC system at full power at any point in time. Shifting larger portions (e.g., fractions) of the power budget from a first networking element to a second networking element that more directly contributes to overall performance may result in more efficient power provisioning, as compared to a network that does not adopt this method of power shifting (e.g., power optimization). A portion of network links (e.g., in a multiple-path network topology such as a multi-dimensional array or fat tree) can also be turned off and/or configured in a low-power low-performance mode when an analysis identifies that these links are not needed to efficiently execute the HPC application. This shifting and turning off can be referred to as optimizing network power.

Power provisioning of networking resources can be performed in a middleware library (e.g., the Message Passing Interface (MPI) library) statically and/or dynamically. Such a library can include information for creating a mapping of communication topology and network link usage, as well as for dynamically readjusting the mapping as runtime conditions change. Additionally, application-specific knowledge of a communication pattern of an HPC application can be exploited to selectively identify links that contribute to performance and inform a network switch that other links can be turned off or placed in low-power mode, among others, for example.

Identifying a network communication pattern call allows for the identification of an overall application communication pattern and a longer-lasting adjustment of link capacities and power, as compared to networks that attempt to more frequently power individual links, using only local knowledge of current traffic demand. Identifying a network communication pattern can also allow for the examination of topological issues, as compared to other approaches that look to other characteristics such as communication volume and message count, for example.

FIG. 1 is a flow chart illustrating an example of a method 100 for identifying network communication patterns according to the present disclosure. Method 100 can include exploiting application-specific knowledge of a communication pattern of an HPC application to selectively identify network links that contribute to performance. Method 100 can also include informing a network switch that other network links can be turned off or placed in low-power mode, for example.

At 102, a distributed computer program within a network is analyzed. In an example, an HPC middleware program is analyzed during compile time. The middleware program can include, for example, remote direct memory access (ROMA), and/or a low level communication library, such as MPI or Charm. A middleware program, such as MPI, can be instrumented to collect information used to create an initial mapping of a communication topology and/or network links. The middleware program can also be instrumented to collect information that may allow for dynamic readjustment of the communication topology and/or links as the program begins and runtime conditions change.

A communication pattern of the HPC middleware program can be analyzed during compile time and can include discovering, for each node in a communication network, a list of possible logical destinations. This analysis can include determining, measuring, and/or estimating communication frequency (e.g., a frequency bandwidth) within a network link between nodes, and/or how much data is passed through the network link which can be used to assign a "weight" to the network link. The list can also be sorted based on the weight computed from the communication frequency and the amount of data passed.

At 104, virtual network communication traffic is estimated based on the distributed computer program analysis. In an example, a virtual network communication topology is created based on the pattern analysis of the HPC middleware program. Estimating the virtual network communication traffic can include estimating based on runtime sampling, a complete run of an application of the distributed computer program, and/or compile-time estimates. The virtual network communication topology can include a number of nodes in the network, as well as the network links connecting the number of nodes. A node that is more strongly linked to a particular node, as compared to a different node, can be grouped together with that particular node, along with other nodes in which it shares a similarly strong connection, in a "destination clique" (DC). DCs can be created for each node in the network. In an example, there may an upper bound of the size of a DC independent of the number of processes associated with the DC.

At 106, the virtual network communication traffic is mapped to a physical network link, and at 108, the network communication pattern is identified, and the physical communication network link is categorized based on an estimated communication intensity of the mapped communication traffic and the network communication pattern.

Mapping the virtual network communication traffic can include mapping using fixed routing tables and/or optimizing routing based on the virtual communication traffic. The communication intensity can include an amount of traffic on the physical communication network link. In a number of embodiments, the link categorizations can be based on whether the link is communicating above a particular threshold (e.g., "strongly"), below a particular threshold (e.g., "weakly"), and/or not at all.

In an example, the physical communication network link is categorized within the network topology based on the HPC middleware program analysis and the network topology. The network link can be categorized into a number of categories. By doing so, a networking topology (e.g., a networking organization) with more efficient power provisioning can be created, as compared to a topology without categorized network links.

The network links categories can include, "always-on", "always-off", and "standby", among others. An always-on category may include network links in the topology belonging to DCs of each node. An always-off category may include network links in the topology that are not used (e.g., not needed) by any DC in a target HPC application. A standby category may include all links not included in the always-on or always-off categories. For example, this could include situations where the program pattern analysis was imperfect or data provided was incomplete.

The network link categorizations can be passed on to network switches that can use the information to program (e.g., optimize) the network links and program routes in multiple-level switches to connect a number of (e.g., two) nodes. For example, an always-on network link can be programmed to be in a fastest mode available in the network (e.g., require maximum networking performance), an always-off network link can be turned off (e.g., turned completely off by reprogramming a routing table and/or whose route can be turned off in the network switches), and a standby network link can be programmed to be controllable by a dynamic link-level mechanism (e.g., to take advantage of dynamic power saving mechanisms such as the ones advocated by the Energy Efficient Ethernet (EEE) proposed standards). In an example, a standby network link's power management can be left under control of a specific link implementation.

The network topology can be revised based on measurements taken within the middleware program during runtime. When the program is no longer in compile time, determinations, measurements, and/or estimations regarding communication within a network link between nodes, and/or how much data is passed through the network link can be considered. This can allow for a revision of the network topology, depending on changes to the program or network during runtime.

For example, the middleware program can be monitored in time-based and/or network-event-based "epochs," with the epoch durations being estimated based on characteristics of an overall network architecture and a size of an application. Epoch durations can be estimated heuristically, for example, and can be expressed in elapsed time, number of networking events (e.g., messages), and/or traffic.

The physical communication network link can be categorized within the revised topology based on the measurements taken within the middleware program and the revised topology. Using the revised topology, which may take into consideration changes during runtime, the network link can be categorized and/or re-categorized. Similar to the categorizations made in runtime, the network link may be categorized as "always-on", "always-off", and "standby", among others.

The categorization and the network communication pattern (e.g., revised topology) can be passed on to network switches for programming. For example, the network communication pattern (e.g., a revised network topology) can be communicated to a number of network switches using a side-channel network management message, and communication routes can be reprogrammed in the switches. A network switch can be programmed based on the categorization to re-program the routes that the switch uses to establish communication between a number of (e.g., two) nodes in the topology.

At 110, an energy used by the network is optimized based on the categorization of the physical communication network link. For example, the energy used by the network (e.g., network power usage) can be optimized to match the communication pattern and shift a fraction (e.g., larger fractions) of a power budget to computing elements of the HPC middleware program that more directly can contributed to the overall performance of the program. The energy used can be optimized through routing, for example. Network traffic can be concentrated in a particular manner, and/or physical links that are unused or used less frequently than other links can be turned off or placed in a lower power state.

Figure 2:
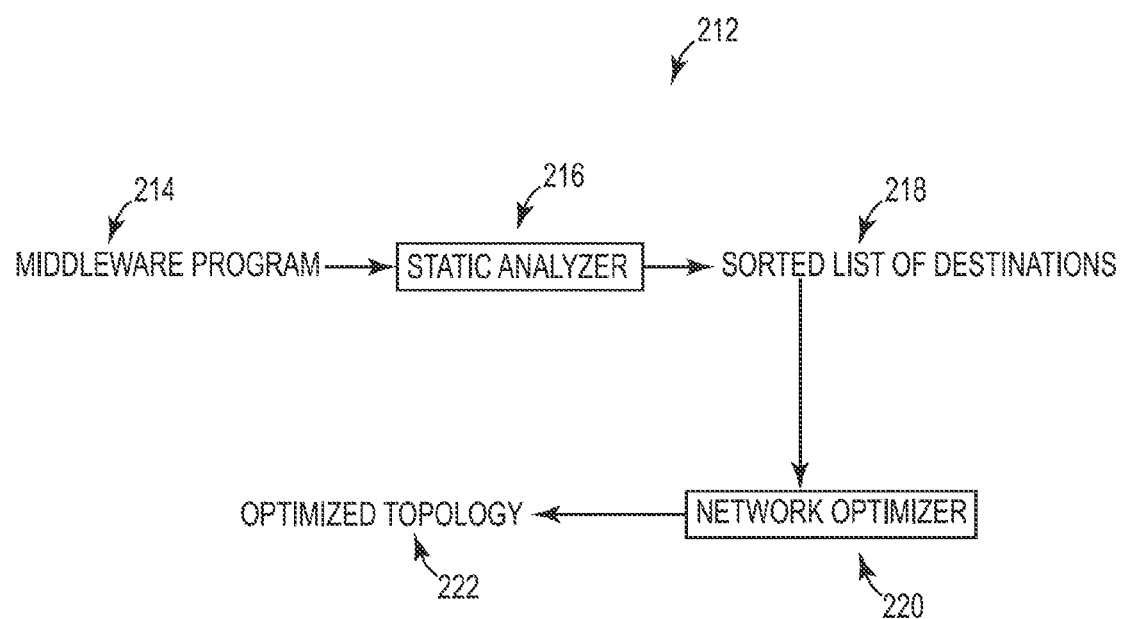
FIG. 2 is a functional block diagram associated with identifying network communication patterns according to the present disclosure.

FIG. 2 is a functional block diagram 212 associated with identifying network communication patterns according to the present disclosure. Identifying network communication patterns can include a static initialization phase in which an HPC program is analyzed offline, before running (e.g., at compile time). FIG. 2 illustrates a middleware program 214 (e.g., an MPI program library) analyzed statically (e.g., during or after compilation and before executing the HPC program) utilizing a static analyzer 216, where the static analyzer 216 can discover, for each node in a network, a list of possible destinations (e.g., a list of likely possible destinations). A static analyzer can also receive input from a programmer regarding possible destinations.

Based on control flow information inferred by analysis of the communication patterns by instrumenting the middleware program (e.g., identifying regular patterns such as loops) and heuristic estimates, the static analyzer 216 can output a sorted list of destinations 218 based on communication frequency and amount of passed data (e.g., weight).

Static analyzer 216 and network optimizer 220 can consider an original network topology and the sorted list of destinations 218 and compute an "optimized" networking topology 222 by classifying (e.g., categorizing) links into categories. For example, a network link can be classified as always-on, always-off, and/or standby, among others. Optimizing the network communication patterns can include, for example, programming modifications to increase a probability of reducing a DC size. For example, a portion (e.g., a fraction) of the network links in a multipath topology can be turned off (e.g., in a multi-dimensional array with two dimensions, by turning off the odd-numbered rows).

The network optimizer 220 can utilize the sorted list 218 and categorized network links to output an optimized network topology 222. The optimized network topology 222 can include a network topology with improved power provisioning and/or power provisioning efficiency as compared to a network topology created without considering a network link categorization and/or a list of destinations (e.g., list 218). The optimized network topology 222 can also include a network topology with improved power provisioning as compared to a previous network topology.

The network link classification and optimized topology information can be passed to the network switches and the network links can be programmed accordingly. For example, always-on links can be programmed to be in a fastest mode available in the network, always-off links can be turned completely off by reprogramming switch routing tables, and standby links can be programmed to be controllable by dynamic link-level mechanisms (e.g., EEE).

What a switch does with the link classification information can depend on a specific network. For example, in Fat Tree or Folded Clos networks, entire upper level switches can be turned off, thereby thinning the tree and increasing power savings. Link power can also be reduced where a network link has a lower utilization in comparison to other network links by reducing the link bandwidth. In another example, Ethernet links can negotiate decreased data rates (e.g., from 10G to 1G or 100M), and various power domains may be adjusted.

The middleware program library (e.g., an MPI library) can determine a communication pattern in terms of user program node to node, and this can be mapped by the runtime onto physical nodes, and by the network switch management onto physical routes. Information about DCs can also be used to optimize logical-to-physical mapping by ensuring that the processes corresponding to nodes in a clique are neighbors (e.g., in different cores inside the same sockets or connected to the same leaf switch).

Figure 3:
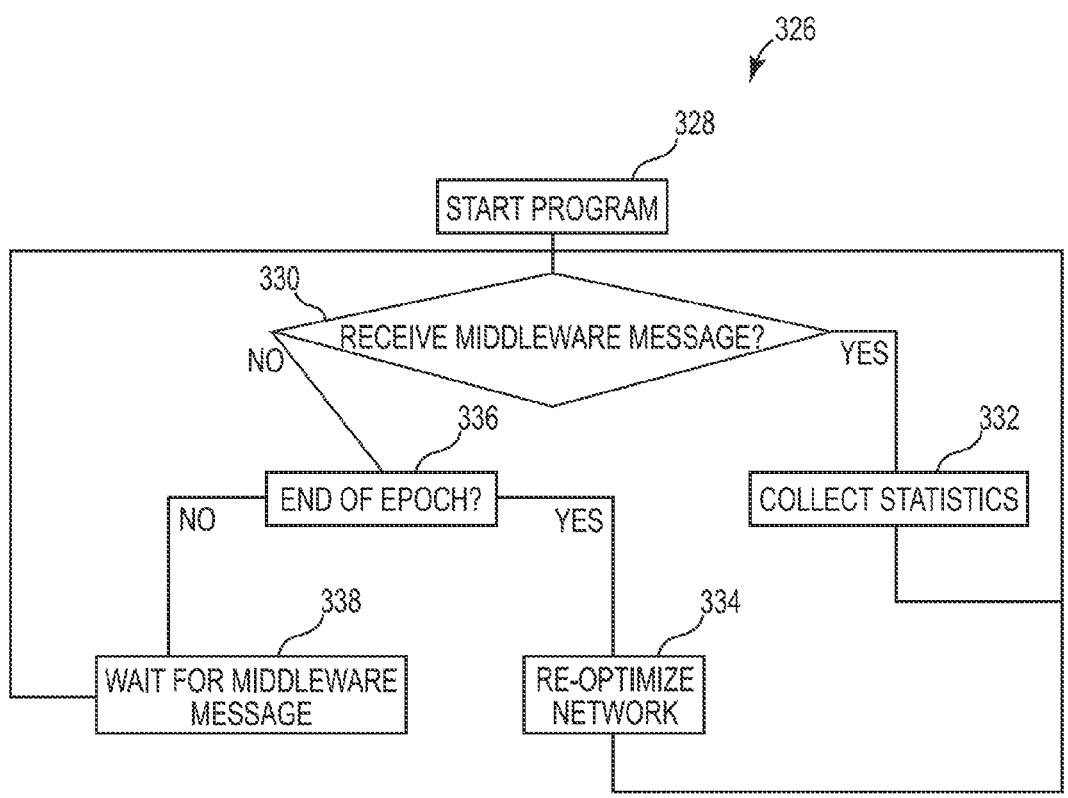
FIG. 3 is a flow chart illustrating an example of a method for identifying network communication patterns according to the present disclosure.

FIG. 3 is a flow chart illustrating an example of a method 326 for identifying network communication patterns according to the present disclosure. Identifying network communication patterns can include a dynamic phase (e.g., a dynamic optimization phase) in which an initial optimized topology is revised (e.g., periodically) based on measurements taken within a low-level communication library (e.g., MPI library) and communicated to the switches using side-channel network management messages. For example, an optimized topology determined during compile time, such as topology 222 as illustrated in FIG. 2, may be revised in runtime to adapt to changes. A separate monitor process can be initiated when an HPC program starts (e.g., during the beginning of the dynamic phase), and the process can hook into a middleware program library (e.g., the low-level communication library such as the MPI or Charm library).

At 328, an HPC program (e.g., an MPI program) is started. A determination is made at 330 whether a message has been received from the middleware program library. If a message has been received, statistics may be collected utilizing a dynamic statistics collection module within the library at 332. These statistics can include communications levels and power usage of network links as provided by the management and monitoring support of a given network system. These statistics can also include possible logical destinations and sizes of network nodes. Per-node statistics, such as, for example, accumulation of messages counts and message sizes, can also be collected. With this statistical information, a determination can again be made at 330 whether a message has been received from the library.

If a message has not been received from the low-level communication library, a determination is made at 336 whether the end of an epoch has been reached. The monitor process can work in time-based "epochs," whose duration can be heuristically estimated from characteristics of an overall network topology and the regularity characteristics of a parallel application. For example, a larger network may require a longer time to communicate changes over the management side channels of the switches as compared to a smaller network. This may result in a longer epoch, as compared to the smaller network. The smaller network may react more rapidly, and can allow for faster readjustments of the network parameters and routes as compared to the larger network.

Network optimization architectures can be determined for a number of epoch based on collected statistics, and these architectures can be periodically revised based on the statistics. A performance difference between the architectures can be calculated, and this can be compared to a threshold performance difference. Based on this comparison, network communication patterns can be identified, and network links can be categorized within the architectures based on the comparison. These network links can be programmed accordingly.

At 338, waiting for a middleware message continues if the end of the epoch has not been reached, and method 326 returns to 330 for a determination whether a middleware message has been received.

If the end of an epoch has occurred, at 334, vectors of DCs can be recomputed and resorted. In an example, if the difference vs. a previous epoch vector exceeds a certain heuristics threshold, a reconfiguration phase can re-optimizes network parameters using a new set of nodes in the DCs, similar to the initial optimization phase. At the end of each epoch, old statistics can be saved in an epoch history vector, and new statistics can be reset to zero, for example. The method can return to determining whether a middleware message has been received. Method 326 can be performed iteratively, including iteratively revising a network topology (e.g., network communication pattern, networking organization) during runtime.

Control mechanisms for network switches and network links can be handled by switch managers. The communication path from an actual parallel application can talk to the switch manager and individual switches. This may involve communication over messaging mechanisms, such as Transmission Control Protocol/Internet Protocol (TCP/IP). Depending on network topology, these considerations can be used in establishing epoch durations which define a threshold (e.g., a minimum threshold) possible granularity at which updates can be made.

In an example, the runtime system can support node migration, and the networking reconfiguration phase can trigger migration of logical nodes that belong to a DC to physical nodes connected to a local switch, so that the probability to be able to turn off switch links increases.

Figure 4:
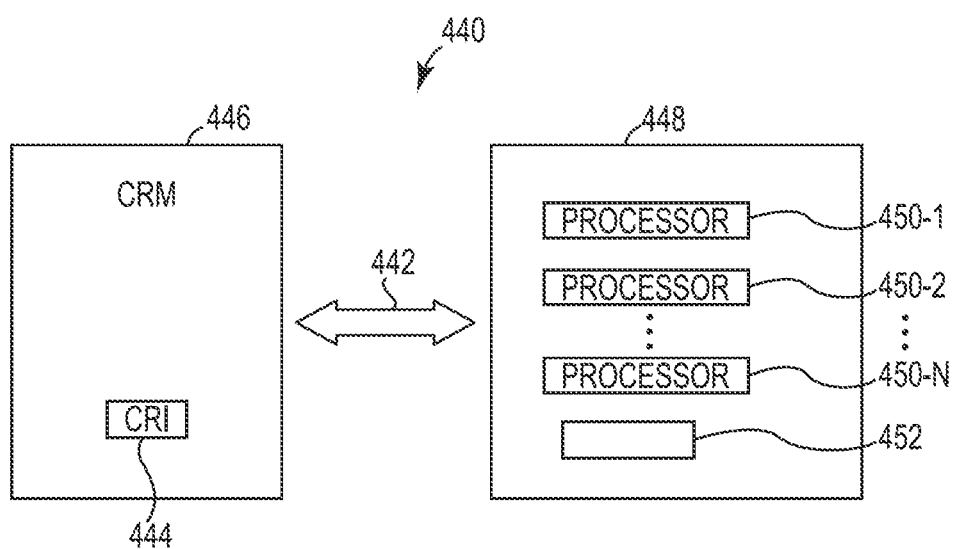
FIG. 4 is a block diagram of an example of a computer-readable medium in communication with processing resources for identifying network communication patterns according to the present disclosure.

FIG. 4 is a block diagram 440 of an example of a computer-readable medium 446 in communication with processing resources 450-1, 450-2 . . . 450-N for identifying network communication patterns according to the present disclosure. Computer-readable medium (CRM) 446 can be in communication with a computing device 448 having processor resources of more or fewer than 450-1, 450-2 . . . 450-N, that can be in communication with, and/or receive a tangible non-transitory CRM 446 storing a set of computer-readable instructions 444 executable by one or more of the processor resources 450-1, 450-2 . . . 450-N for identifying network communication patterns. The computing device 448 may include memory resources 452, and the processor resources 450-1, 450-2 . . . 450-N may be coupled to the memory resources 452.

Processor resources can execute computer-readable instructions 444 for updating a WSDL for a service test and are stored on an internal or external non-transitory CRM 446. A non-transitory CRM (e.g., CRM 446), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), flash memory, etc., as well as other types of CRM.

The non-transitory CRM 446 can be integral, or communicatively coupled, to a computing device (e.g. computing device 448), in either in a wired or wireless manner. For example, the non-transitory CRM 446 can be an internal memory, a portable memory, a portable disk, or a memory located internal to another computing resource (e.g., enabling the computer-readable instructions 444 to be downloaded over the Internet).

The CRM 446 can be in communication with the processor resources 450-1, 450-2 . . . 450-N via a communication path 442. The communication path 442 can be local or remote to a machine associated with the processor resources 450-1, 450-2 . . . 450-N. Examples of a local communication path 442 can include an electronic bus internal to a machine such as a computer where the CRM 446 is one of volatile, non-volatile, fixed, and/or removable storage medium in communication with the processor resources 450-1, 450-2 . . . 450-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 442 can be such that the CRM 446 is remote from the processor resources (e.g., processor resources 450-1, 450-2 . . . 450-N) such as in the example of a network connection between the CRM 446 and the processor resources 450-1, 450-2 . . . 450-N. That is, the communication path 442 can be a network connection. Examples of such a network connection can include a local area network (LAN), a wide area network (WAN), a personal area network (PAN), and the Internet, among others. In such examples, the CRM 446 may be associated with a first computing device and the processor resources 450-1, 450-2 . . . 450-N may be associated with a second computing device.

In a number of embodiments, a non-transitory CRM can storing a set of instructions executable by a computer to cause the computer to analyze an MPI program during compile time and determine a list of logical destinations for each of a number of nodes in a network based on the analysis. In an example, the MPI program can analyze an MPI program and find a communication pattern at runtime, rather than exclusively at compile-time. The instructions can also be executable by the computer to cause the computer to sort the list based on frequency bandwidth and data use of each of a number of network links between the number of nodes, compute a networking organization for the network by categorizing each of the number of network links, and communicate the categorizations to network switches.

Processor resources 450-1, 450-2 . . . 450-N coupled to the memory 452 can monitor, in epochs (e.g., time-based and/or network-event based epochs), network performance within a middleware communication library (e.g., an MPI library) during runtime and collect a number of statistics regarding a node within the network based on the monitoring. Processor resources 450-1, 450-2 . . . 450-N coupled to the memory 452 can determine a first network optimization architecture within a first epoch and a second network optimization architecture within a second epoch based on the statistics and periodically revise the first and second architectures based on the statistics.

Processor resources 450-1, 450-2 . . . 450-N coupled to the memory 452 can calculate a performance difference between the first architecture and the second architecture and compare the performance difference to a threshold, identify communication patterns to categorize network links within the first and second architectures based on the comparison, and program the network links based on the categorization.

In some examples of the present disclosure, the processor resources 450-1, 450-2 . . . 450-N coupled to the memory 452 can analyze a message passing interface (MPI) program during compile time and determine a list of logical destinations for each of a number of nodes in a network based on the analysis. The processor resources 450-1, 450-2 . . . 450-N coupled to the memory 452 can sort the list based on frequency bandwidth and data use of each of a number of network links between the number of nodes, compute a networking organization for the network by categorizing each of the number of network links; and communicate the categorizations to network switches.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

What is claimed:

1. A computer-implemented method for identifying a network communication pattern comprising:
   analyzing a distributed computer program of the network (102);
   estimating virtual network communication traffic based on the analysis (104);
   mapping the virtual network communication traffic to a physical network link (106);
   identifying the network communication pattern and categorizing the physical communication network link based on an estimated communication intensity of the mapped communication traffic and the network communication pattern (108); and
   optimizing an energy used by the network based on the categorization (110).

2. The method of claim 1, further comprising communicating the network communication pattern to a number of network switches using a side-channel network management message and reprogramming communication routes in the number of switches (108).

3. The method of claim 1, wherein categorizing the physical communication network link includes categorizing the physical communication network link as an always-on network link (108).

4. The method of claim 1, wherein categorizing the physical communication network link includes categorizing the physical communication network link as an always-off network link, whose route can be turned off within switches of the network (108).

5. The method of claim 1, wherein categorizing the physical communication network link includes categorizing the physical communication network link as a standby network link, whose power management is controlled by specific network link implementations (108).

6. The method of claim 1, wherein estimating the virtual network communication traffic includes estimating the traffic based on at least one of runtime sampling, a complete run of an application of the distributed computer program, and compile-time estimates (104).

* * * * *